US010778003B2

(12) United States Patent
Liu et al.

(10) Patent No.: US 10,778,003 B2
(45) Date of Patent: Sep. 15, 2020

(54) METHOD OF FREE WAVE ENERGY PROTECTION FOR HALF-WAVELENGTH LINE BASED ON ONE SIDED CURRENT

(71) Applicants: CHINA ELECTRIC POWER RESEARCH INSTITUTE COMPANY LIMITED, Beijing (CN); STATE GRID CORPORATION OF CHINA, Beijing (CN); STATE GRID CENTRAL CHINA GRID COMPANY LTD., Wuhan (CN)

(72) Inventors: Huanzhang Liu, Wuhan (CN); Zexin Zhou, Beijing (CN); Dingxiang Du, Beijing (CN); Yarong Guo, Beijing (CN); Xiao Li, Beijing (CN); Xuming Liang, Beijing (CN); Delin Wang, Beijing (CN); Xingguo Wang, Beijing (CN)

(73) Assignees: CHINA ELECTRIC POWER RESEARCH INST. CO. LIMITED, Beijing (CN); STATE GRID CORPORATION OF CHINA, Beijing (CN); STATE GRID CENTRAL CHINA GRID COMPANY LTD., Wuhan (CN)

(*) Notice: Subject to any disclaimer, the term of this patent is extended or adjusted under 35 U.S.C. 154(b) by 270 days.

(21) Appl. No.: 16/065,693

(22) PCT Filed: Jul. 18, 2016

(86) PCT No.: PCT/CN2016/090330
§ 371 (c)(1),
(2) Date: Jun. 22, 2018

(87) PCT Pub. No.: WO2017/133189
PCT Pub. Date: Aug. 10, 2017

(65) Prior Publication Data
US 2019/0013667 A1  Jan. 10, 2019

(30) Foreign Application Priority Data

Feb. 3, 2016 (CN) .......................... 2016 1 0076856

(51) Int. Cl.
*H02H 7/26* (2006.01)
*H02H 1/00* (2006.01)

(52) U.S. Cl.
CPC .......... *H02H 7/265* (2013.01); *H02H 1/0007* (2013.01); *H02H 1/0092* (2013.01)

(58) Field of Classification Search
CPC .... H02H 7/262–265; H02H 7/22; H02H 7/26; H02H 7/045; H02H 7/0455;
(Continued)

(56) References Cited

U.S. PATENT DOCUMENTS

2017/0082675 A1* 3/2017 Schweitzer, III .... H02H 1/0007

FOREIGN PATENT DOCUMENTS

| CN | 104391191 A | 3/2015 |
| CN | 104578069 A | 4/2015 |

(Continued)

OTHER PUBLICATIONS

International Search Report in international application No. PCT/CN2016/090330, dated Nov. 1, 2016.
(Continued)

*Primary Examiner* — Bryan R Perez
(74) *Attorney, Agent, or Firm* — Syncoda LLC; Feng Ma

(57) ABSTRACT

A method of free wave energy protection for a half-wavelength line based on a one-sided current includes: performing sampling and calculation on a current at protection measuring points to obtain variations in current sampling values; and activating a protective element to determine an occurrence time of a fault in a half-wavelength line. A free wave energy protection section includes a quick-action
(Continued)

section, a basic section and a sensitive section, wherein the quick-action section, the basic section and the sensitive section serve as action criteria for performing protection with respect to the free wave energy of the half-wavelength line.

6 Claims, 9 Drawing Sheets

(58) Field of Classification Search
CPC ...... H02H 1/0007; H02H 1/0092; H02H 3/02; H02H 3/30; H02H 3/083; G11B 17/043; G01R 31/088
See application file for complete search history.

(56) References Cited

FOREIGN PATENT DOCUMENTS

| CN | 105552865 A | 5/2016 |
|---|---|---|
| RU | 2303323 C1 | 7/2007 |

OTHER PUBLICATIONS

Written Opinion of the International Search Authority in international application No. PCT/CN2016/090330, dated Nov. 1, 2016.
Xiao, Shiwu et al.,"A Bergeron Model Based Current Differential Protection Principle for UHV Half-Wavelength AC Transmission Line", Power System Technology, vol. 35, No. 9, Sep. 30, 2011 (Sep. 30, 2011), ISSN: 10003673, pp. 46-49.
Liu, Jianhui,"Study on Protection Principle or Half Wavelength AC Transmission Line Based on Distributed Parameters", China Master's Theses Full Text Database, No. 7, Jul. 15, 2015 (Jul. 15, 2015), ISSN: 16740246, chapter one.
Dias, R. et al., "Analysis of a Series Tap for Half-Wavelength Transmission Lines Using Active Filters", IEEE 36TH Power Electronics Specialists Conference,Recife, Brazil, Jun. 16, 2005 (Jun. 16, 2005).
"Half-Wave Length Line Energization Case Test—Proposition of a Real Test", issued on Nov. 12, 2008.
"Analysis of the Fault and the Relay Protection for Half Wavelength AC Transmission Line", issued on Jan. 15, 2014.
English Translation of the Written Opinion of the International Search Authority in international application No. PCT/CN2016/090330, dated Nov. 1, 2016.

\* cited by examiner

METHOD OF FREE WAVE ENERGY PROTECTION FOR HALF-WAVELENGTH LINE BASED ON ONE SIDED CURRENT

TECHNICAL FIELD

The disclosure relates to the field of relay protection of power systems, and particularly to a single-side current-based free wave energy protection method for a half wavelength line.

BACKGROUND

Under a framework system using the concept of Internet of global energy, half wave transmission attracts more and more attentions as an alternating current long-distance transmission technology. Half wave transmission refers to that a length of a transmission line is a distance of transmission of an electromagnetic wave in a half period (when a frequency is 50 hertz (Hz), the corresponding length is 3,000 kilometers). For a half wavelength transmission line, due to the fact that a length of the line is far more than a conventional transmission distance, its electromagnetic wave presents an obvious fluctuation characteristic, which makes normal operation and fault electrical characteristics of the half wavelength line different from a conventional medium/short-distance transmission line. Conventional line protection may not be adapted to the characteristic and operation requirement of the half wavelength line. In order to implement protection over the half wavelength line, a new protection solution and method are required to be discussed in combination with its fault electrical characteristic.

A free wave is a free component in the fault transient process of a half wavelength transmission system. In case of faults in and outside a half wavelength line region, the free wave represents radically different waveform characteristics. The disclosure discloses a novel half wavelength protection method using such a characteristic. In the existing protection solution, traveling wave protection is applied more widely in direct current transmission line, but it also has some shortcomings. For example: an extremely high sampling rate is required, which is usually hundreds of KHz; the influence of a capacitive voltage transformer exists; and non-unit traveling wave protection is inaccurate. Therefore, it is necessary to seek for a free wave-based protection method capable of overcoming these shortcomings to improve safety of a half wavelength transmission line.

SUMMARY

In view of this, embodiments of the disclosure provide a single-side current-based free wave energy protection method for a half wavelength line, which may lower the requirement on the sampling rate of the device hardware and furthermore solve the problem of influence of a capacitive voltage transformer on conventional traveling wave protection, has the advantages of accuracy, efficiency and reliability and further ensures safe and reliable operation of the half wavelength line.

The embodiments of the disclosure adopt the following technical solutions.

In the first aspect, the embodiments of the disclosure provide a single-side current-based free wave energy protection method for a half wavelength line, a protection measuring point and a starting element being arranged on the half wavelength line, three protection sections being set for free wave energy, referring to FIG. 6, the three protection sections being a quick action section (a free wave energy protection section I, called as a section I for short), a basic section (a free wave energy protection section II, called as a section II for short) and a sensitive section (a free wave energy protection section III, called as a section III for short) respectively and the method including the following steps:

Step 1: the protection measuring point samples and calculates currents to obtain variations of current sampling values;

Step 2: the starting element acts to determine the occurrence time of a fault on the half wavelength line;

Step 3: the variations of the current sampling values are calculated within the quick action section (the section I) to obtain the free wave energy, and it is determined whether the quick action section (the section I) acts, if YES, the quick action section (the section I) acts for protection, and if NO, proceed to Step 4;

Step 4: the current sampling values are calculated within the basic section to obtain the free wave energy, and it is determined whether the basic section (the section II) acts, if YES, the basic section (the section II) acts for protection, and if NO, proceed to Step 5; and Step 5: it is determined whether the sensitive section (the section III) acts according to a position of the fault and a permission command, if YES, the sensitive section (the section III) acts for protection, and if NO, return to Step 1.

In another embodiment of the disclosure, Step 1 includes:

Step 1-1: the protection measuring point samples current values of a cycle before occurrence of the fault and present current values respectively to obtain a before-fault sampling value and present sampling value of each phase current, herein the sampling rate is 48 sampling points per cycle; and Step 1-2: the variations of the current sampling values are calculated according to the before-fault sampling values and present sampling values of the currents.

Preferably, Step 2 includes that:

the starting element acts to determine the occurrence time t of the fault of the half wavelength line:

$$\begin{cases} \Delta f(t) = \Delta i_A^2(t) + \Delta i_B^2(t) + \Delta i_C^2(t) \\ |d\Delta f(t)| > f_{set} \end{cases} \quad (1)$$

in the formula (1), $f_{set}$ being an action fixed value and $f_{set}$=0.1 KA$^2$, $\Delta i_A(t)$, $\Delta i_B(t)$ and $\Delta i_C(t)$ being sudden changes of the currents of the three phases A, B and C respectively and $\Delta f(t)$ being a variation of a quadratic sum of the sudden changes of the currents of the three phases.

In another embodiment of the disclosure, Step 3 includes:

Step 3-1: for sampling points −2 to 22 at which the starting element acts, zero-sequence and negative-sequence variation phases of the variations $\Delta i_A$, $\Delta i_B(t)$ and $\Delta i_C(t)$ of the currents of the three phases are calculated on a point-by-point basis by using a half wave Fourier sequence filtering window, and values of $\Delta \dot{I}_0 + \Delta \dot{I}_{A2}$, $\Delta \dot{I}_0 + \Delta \dot{I}_{B2}$ and $\Delta \dot{I}_0 + \Delta \dot{I}_{C2}$ are calculated, where $\Delta \dot{I}_0$ is the variation phase value of the zero-sequence current, and $\Delta \dot{I}_{A2}$, $\Delta \dot{I}_{B2}$ and $\Delta \dot{I}_{C2}$ are variation phase values of negative-sequence currents of the phases A, B and C respectively;

Step 3-2: the zero-sequence and negative-sequence phase sums $\Delta \dot{I}_0 + \Delta \dot{I}_{A2}$, $\Delta \dot{I}_0 \Delta \dot{I}_{B2}$ and $\Delta \dot{I}_0 + \Delta \dot{I}_{C2}$ of the phases A, B and C are restored into the sampling values $\Delta i_{A02}(t)$, $\Delta i_{B02}(t)$ and $\Delta i_{C02}(t)$;

Step 3-3: zero and negative sequences in the variations of the sampling values $\Delta i_{A02}(t)$, $\Delta i_{B02}(t)$ and $\Delta i_{C02}(t)$ are filtered from the variations of the sampling values $\Delta i_A(t)$, $\Delta i_B(t)$ and $\Delta i_C(t)$ to obtain current variation sampling values $i_A(t)$, $i_B(t)$ and $i_C(t)$ which are subjected to filtering of the zero sequences and the negative sequences:

$$i_A(t) = \Delta i_A(t) - \Delta i_{A02}(t)$$

$$i_B(t) = \Delta i_B(t) - \Delta i_{B02}(t)$$

$$i_C(t) = \Delta i_C(t) - \Delta i_{C02}(t) \qquad (2),$$

in the formula (2), $\Delta i_A(t)$, $\Delta i_B(t)$ and $\Delta i_C(t)$ being the variations, caused by the fault, of the current sampling values of the currents of the phases A, B and C at a moment t;

Step 3-4: a quadratic sum function $f(t)$ is constructed:

$$f(t) = i_A^2(t) + i_B^2(t) + i_C^2(t) \qquad (3),$$

the quadratic sum function is differentiated, then an absolute value is calculated to obtain $|df(t)|$, and $|df(t)|$ is integrated to obtain a free wave energy value;

Step 3-5: it is determined whether the following formula (4) about the free wave energy is true:

$$\sum_{i \in I} |df(t)| > 250 + 2.5 \max_{i \in I} |df(t)| \quad I = \{-2, \ldots, 21\}, \qquad (4)$$

in the formula (4), i being a sampling point and I being an integral interval, if the formula (4) is false, proceed to Step 4, and
if the formula (4) is true, proceed to Step 3-6; and Step 3-6: after the sampling point 22, sequence filtering is performed using a full wave Fourier data window, and the formula (4) is converted into the following formula (5), it is determined whether the formula (5) is true:

$$\sum_{i \in I} |df(t)| > 150 + k \max_{i \in I} |df(t)| \quad I = \{-2, \ldots, 45\}, \qquad (5)$$

in the formula (5), the value of k is reduced by a step length of 0.05 for the totally 48 sampling points which are from point −2 to point 45 on a point-by-point basis and the initial value of k is set to 5.

If the formula (5) is false, proceed to Step 4, and
if the formula (5) is true, the quick action section (the section I) acts for protection.

In another embodiment of the disclosure, Step 4 includes:

Step 4-1: the zero-sequence and negative-sequence variation phases of the variations $\Delta i_A(t)$, $\Delta i_B(t)$ and $\Delta i_C(t)$ of the currents of the three phases are calculated by using the full wave Fourier sequence filtering window, and the values of $\Delta \dot{I}_0 + \Delta \dot{I}_{A2}$, $\Delta \dot{I}_0 + \Delta \dot{I}_{B2}$ and $\Delta \dot{I}_0 + \Delta \dot{I}_{C2}$ are calculated, where $\dot{I}_{A[0]}$, $\dot{I}_{B[0]}$ and $\dot{I}_{C[0]}$ are the after-fault phase values of the currents of the phases A, B and C respectively, and $\Delta \dot{I}_{A2}$, $\Delta \dot{I}_{B2}$ and $\Delta \dot{I}_{C2}$ are the variation phase values of the negative-sequence currents of the phases A, B and C respectively;

Step 4-2: the zero-sequence and negative-sequence phase sums of the phases A, B and C are restored into the sampling values $\Delta i_{A02}(t)$, $\Delta i_{B02}(t)$ and $\Delta i_{C02}(t)$;

Step 4-3: the zero and negative sequences in the variations of the sampling values are filtered, and the current variation sampling values $i_A(t)$, $i_B(t)$ and $i_C(t)$ subjected to filtering of the zero sequences and the negative sequences are obtained according to the formula (2);

Step 4-4: the quadratic sum function $f(t)$ is constructed according to the formula (3), the quadratic sum function is differentiated, then the absolute value is calculated to obtain $|df(t)|$, and $|df(t)|$ is integrated to obtain the free wave energy value; and Step 4-5: it is determined whether the following formula (6) about the free wave energy is true:

$$\sum_{i \in I} |df(t)| > 30 + 0.3 \sum_{i \in J} |df(t)| + 2 \max_{i \in I} |df(t)|, \qquad (6)$$

in the formula (6), I={4, . . . , 45} J={46, . . . , 57},
if the formula (6) is false, proceed to Step 4, and
if the formula (6) is true, the basic section (the section II) acts for protection.

In another embodiment of the disclosure, Step 5 includes that:

it is determined whether a criterion formula (7) for the sensitive section (the section III) is true according to the position of the fault and the permission command:

$$\sum_{i \in I} |df(t)| > 8 + 2 \max_{i \in I} |df(t)| \quad I = \{L, \ldots, H\}, \qquad (7)$$

in the formula (7), L being a lower limit of the integral interval and H being an upper limit of the integral interval;

if the permission command is received and an estimation result of the position of the fault is more than 2,000 km, the sensitive section acts for protection, and it is determined that the integral interval I should be from sampling points −2 to 45;

if the permission command is received and the estimation result of the position of the fault is within a range of {(1500−1), . . . , (1500+1)} 1≤500 km, the sensitive section acts for protection, and it is determined that the integral interval I should be from sampling points −2 to 45;

if the permission command is received and the estimation result of the position of the fault is within a range {α, . . . , (1500−1)}, 1≤500 km, α≤100 km, the sensitive section acts for protection, and it is determined that the integral interval I is from point L to point H, where $$L = \frac{24}{1000-a} 1 - \frac{12000}{1000-a} - 2 \text{ and } H = 48 - L;$$

and when the permission command is not received or the estimation result of the position of the fault is within a range of {0, . . . , α}, α≤100 km, latching protection is performed, and return to Step 1.

From the technical solutions, the disclosure provides the single-side current free wave energy protection method for the half wavelength line. In the method, the currents are sampled and calculated to obtain the variations of the current sampling values through the protection measuring point at first; and then the starting element determines the quick action section, basic section and sensitive section included in the free wave energy protection sections as action criterions, thereby protecting the half wavelength line, and in other words, the half wavelength line is protected using free wave energy characteristics after the fault (i.e. the free wave energy protection sections). The free wave energy-based half wavelength line protection method disclosed by the embodiments of the disclosure lowers a number requirement on sampling, furthermore solves the problem of influence of a capacitive voltage transformer, is accurate, efficient and reliable, considers both reliability and sensitivity of a protection action over the half wavelength line, and ensures safe and reliable operation of the half wavelength line.

Compared with a closest conventional art, the technical solutions provided by the embodiments of the disclosure have the following beneficial effects.

1) In the technical solutions provided by the embodiments of the disclosure, waveform characteristics of free waves are analyzed in case of faults in and outside a region, and integration of the free waves is proposed, that is, energy magnitudes of the free waves after the faults are compared to distinguish the faults in and outside the region. On such a basis, the action criterions for the quick action section, basic section and sensitive section for free wave energy protection are proposed.

2) According to the technical solutions provided by the embodiments of the disclosure, sequence filtering algorithms, integral intervals and action time limits of each section are different, so that the reliability and sensitivity of the protection action over the half wavelength line are both considered.

3) According to the technical solutions provided by the embodiments of the disclosure, the currents are sampled and calculated to obtain the variations of the current sampling values through the protection measuring point, and the protection starting element starts the protection, and the main protection element determines whether the quick action section, the basic section and the sensitive section to act. The free wave energy-based half wavelength line protection method disclosed by the embodiments of the disclosure lowers the number requirement on sampling, furthermore solves the problem of influence of the capacitive voltage transformer, has the advantages of accuracy, efficiency and reliability, considers both the reliability and sensitivity of the protection action over the half wavelength line, and ensures the safe and reliable operation of the half wavelength line.

4) The technical solutions provided by the embodiments of the disclosure can be widely applied, and have remarkable social benefits and economic benefits.

DETAILED DESCRIPTION

The technical solutions in the embodiments of the disclosure will be clearly and completely described below in combination with the drawings in the embodiments of the disclosure. Obviously, the described embodiments are not all embodiments but only part of embodiments of the disclosure. All other embodiments obtained by those skilled in the art on the basis of the embodiments of the disclosure without creative work fall within the scope of protection of the disclosure.

Figure 1:
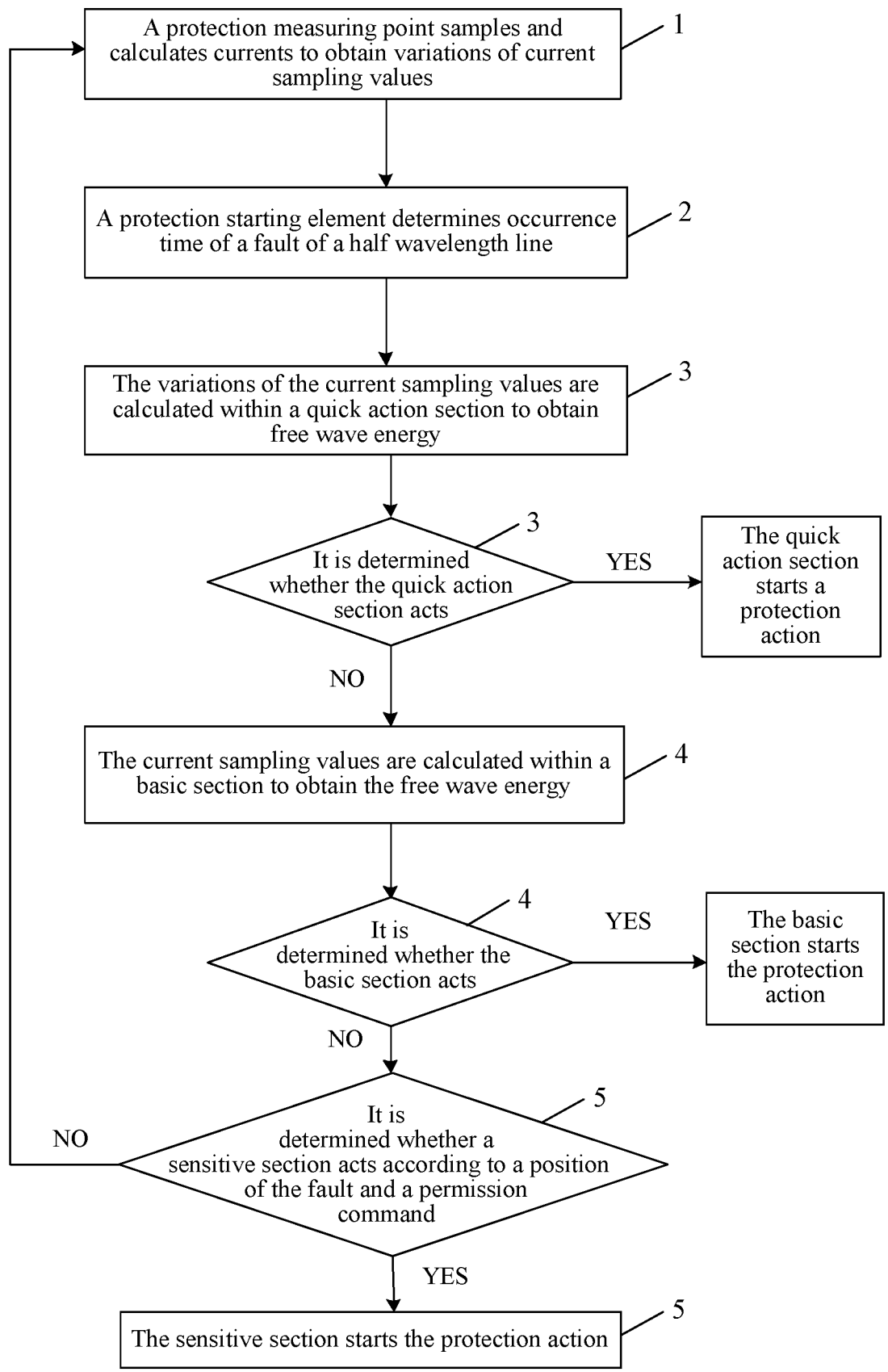
FIG. 1 is a flowchart of a free wave energy-based half wavelength line protection method according to the disclosure.

As shown in FIG. 1, an embodiment of the disclosure provides a single-side current-based free wave energy protection method for a half wavelength line, a protection measuring point and a starting element being arranged on the half wavelength line, protection sections with integral intervals being set for free wave energy and the protection sections including a quick action section, a basic section and a sensitive section, herein the starting element is a composition content of a starting algorithm of a program. The method includes the following steps.

In Step 1, the protection measuring point samples and calculates currents to obtain variations of current sampling values.

In Step 2, the starting element acts to determine occurrence time of a fault of the half wavelength line.

In Step 3, the variations of the current sampling values are calculated within the quick action section to obtain the free wave energy, it is determined whether the quick action section acts, if YES, the quick action section acts for protection, and if NO, proceed to Step 4.

In Step 4, the current sampling values are calculated within the basic section to obtain the free wave energy, it is determined whether the basic section acts, if YES, the basic section acts for protection, and if NO, proceed to Step 5.

In Step 5, it is determined whether the sensitive section acts according to a position of the fault and a permission command, if YES, the sensitive section acts for protection, and if NO, return to Step 1.

In another embodiment of the disclosure, Step 1 includes the following steps.

In Step 1-1, the protection measuring point samples current values of a cycle before occurrence of the fault and present current values respectively to obtain a before-fault sampling value and present sampling value of each phase current, herein a sampling rate is 48 sampling points per cycle.

In Step 1-2, the variations of the current sampling values are calculated according to the before-fault sampling values and present sampling values of the currents.

In another embodiment of the disclosure, Step 2 includes that:

the starting action acts to determine the occurrence time t of the fault of the half wavelength line according to a formula (1):

$$\begin{cases} \Delta f(t) = \Delta i_A^2(t) + \Delta i_B^2(t) + \Delta i_C^2(t) \\ |d\Delta f(t)| > f_{set} \end{cases} \quad (1)$$

in the formula (1), $f_{set}$ being an action fixed value and $f_{set}=0.1\ KA^2$, $\Delta i_A(t)$, $\Delta i_B(t)$ and $\Delta i_C(t)$ being sudden changes of the currents of the three phases A, B and C respectively and $\Delta f(t)$ being a variation of a quadratic sum of the sudden changes of the currents of the three phases.

In another embodiment of the disclosure, Step 3 includes the following steps.

In Step 3-1, for sampling points −2 to 22 at which the starting element acts, zero-sequence and negative-sequence variation phases of the variations $\Delta i_A(t)$, $\Delta i_B(t)$ and $\Delta i_C(t)$ of the currents of the three phases are calculated on a point-by-point basis by using a half wave Fourier sequence filtering window, and values of $\Delta \dot{I}_0+\Delta \dot{I}_{A2}$, $\Delta \dot{I}_0+\Delta \dot{I}_{B2}$ and $\Delta \dot{I}_0+\Delta \dot{I}_{C2}$ are calculated, where $\Delta \dot{I}_0$ is the variation phase value of the zero-sequence current, and $\Delta \dot{I}_{A2}$, $\Delta \dot{I}_{B2}$ and $\Delta \dot{I}_{C2}$ are variation phase values of negative-sequence currents of the phases A, B and C respectively.

In Step 3-2, the zero-sequence and negative-sequence phase sums of the phases A, B and C are restored into sampling values $\Delta i_{A02}(t)$, $\Delta i_{B02}(t)$ and $\Delta i_{C02}(t)$.

In Step 3-3, zero and negative sequences in the variations of the sampling values are filtered to obtain current variation sampling values $i_A(t)$, $i_B(t)$ and $i_C(t)$ subjected to filtering of the zero sequences and the negative sequences:

$$i_A(t)=\Delta i_A(t)-\Delta i_{A02}(t)$$

$$i_B(t)=\Delta i_B(t)-\Delta i_{B02}(t)$$

$$i_C(t)=\Delta i_C(t)-\Delta i_{C02}(t) \quad (2),$$

in the formula (2), $\Delta i_A(t)$, $\Delta i_B(t)$ and $\Delta i_C(t)$ being the variations, caused by the fault, of the current sampling values of the currents of the phases A, B and C at a moment t.

In Step 3-4, a quadratic sum function $f(t)$ is constructed:

$$f(t)=i_A^2(t)+i_B^2(t)+i_C^2(t) \quad (3),$$

the quadratic sum function is differentiated, then an absolute value is calculated to obtain $|df(t)|$, and $|df(t)|$ is integrated to obtain a free wave energy value.

In Step 3-5, it is determined whether the following formula (4) about the free wave energy is true:

$$\sum_{i \in I} |df(t)| > 250 + 2.5\max_{i \in I}|df(t)| \quad I = \{-2, \ldots, 21\}, \quad (4)$$

in the formula (4), i being a sampling point and I being an integral interval, if the formula (4) is false, proceed to Step 4, and if the formula (4) is true, proceed to Step 3-6.

In Step 3-6, after the sampling point 22, sequence filtering is performed using a full wave Fourier data window, and the formula (4) is converted into the following formula (5), it is determined whether the formula (5) is true:

$$\sum_{i \in I} |df(t)| > 150 + k\max_{i \in I}|df(t)| \quad I = \{-2, \ldots, 45\}, \quad (5)$$

in the formula (5), the value of k is reduced by a step length of 0.05 for the totally 48 sampling points which are from point −2 to point 45 on a point-by-point basis and the initial value of k is set to 5.

If the formula (5) is false, proceed to Step 4, and if the formula (5) is true, the quick action section (the section I) acts for protection.

In another embodiment of the disclosure, Step 4 includes the following steps.

In Step 4-1, the zero-sequence and negative-sequence variation phases of the variations $\Delta i_A(t)$, $\Delta i_B(t)$ and $\Delta i_C(t)$ of the currents of the three phases are calculated by using the full wave Fourier sequence filtering window, and the values of $\Delta \dot{I}_0+\Delta \dot{I}_{A2}$, $\Delta \dot{I}_0+\Delta \dot{I}_{B2}$ and $\Delta \dot{I}_0+\Delta \dot{I}_{C2}$ are calculated, where $\dot{I}_{A[0]}$, $\dot{I}_{B[0]}$ and $\dot{I}_{C[0]}$ are the after-fault phase values of the currents of the phases A, B and C respectively, and $\Delta \dot{I}_{A2}$, $\Delta \dot{I}_{B2}$ and $\Delta \dot{I}_{C2}$ are the variation phase values of the negative-sequence currents of the phases A, B and C respectively.

In Step 4-2, the zero-sequence and negative-sequence phase sums of the phases A, B and C are restored into the sampling values $\Delta i_{A02}(t)$, $i_{B02}(t)$ and $\Delta i_{C02}(t)$.

In Step 4-3, the zero and negative sequences in the variations of the sampling values are filtered, and the current variation sampling values $i_A(t)$, $i_B(t)$ and $i_C(t)$ subjected to filtering of the zero sequences and the negative sequences are obtained according to the formula (2).

In Step 4-4, the quadratic sum function $f(t)$ is constructed according to the formula (3), the quadratic sum function is differentiated, then the absolute value is calculated to obtain $|df(t)|$, and $|df(t)|$ is integrated to obtain the free wave energy value.

In Step 4-5, it is determined whether the following formula (6) about the free wave energy is true:

$$\sum_{i \in I} |df(t)| > 30 + 0.3\sum_{i \in J} |df(t)| + 2\max_{i \in I}|df(t)|, \quad (6)$$

in the formula (6), I={4, . . . , 45} J={46, . . . , 57}, if the formula (6) is false, proceed to Step 4, and if the formula (6) is true, the basic section (the section II) acts for protection.

herein, Step 5 includes that:

it is determined whether a criterion formula (7) for the sensitive section (the section III) is true according to the position of the fault and the permission command:

$$\sum_{i \in I} |df(t)| > 8 + 2\max_{i \in I}|df(t)| \quad I = \{L, \ldots, H\}, \quad (7)$$

in the formula (7), L being a lower limit of the integral interval and H being an upper limit of the integral interval;

if the permission command is received and an estimation result of the position of the fault is more than 2,000 km, the sensitive section acts for protection, and it is determined that the integral interval I includes the sampling points −2 to 45;

if the permission command is received and the estimation result of the position of the fault is within a range of {(1500−1), . . . , (1500+1)} 1≤500 km, the sensitive section acts for protection, and it is determined that the integral interval I includes the sampling points −2 to 45;

if the permission command is received and the estimation result of the position of the fault is within a range $\{\alpha, \ldots, (1500-1)\}$, $1 \le 500$ km, $\alpha \le 100$ km, the sensitive section acts for protection, and it is determined that the integral interval I is L to H, where $$L = \frac{24}{1000-a} 1 - \frac{12000}{1000-a} - 2 \text{ and } H = 48 - L;$$

and when the permission command is not received or the estimation result of the position of the fault is within a range of $\{0, \ldots, \alpha\}$, $\alpha \le 100$ km, latching protection is performed, and return to Step 1.

Figure 2:
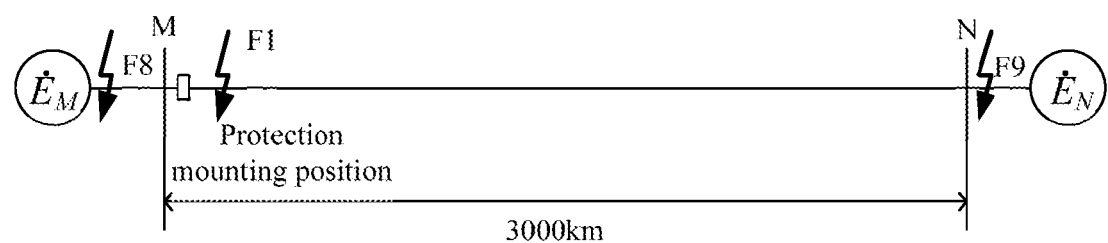
FIG. 2 is a schematic diagram of an analogue simulation system for a half wavelength line according to a specific application example of the disclosure.

An embodiment of the disclosure provides a specific application example of a free wave energy-based half wavelength line protection method, herein the free wave energy-based half wavelength line protection method is implemented in an analogue simulation system for a half wavelength line, and the analogue simulation system for the half wavelength line is shown in FIG. 2 as follows.

(1) Occurrence Time of a Fault is Determined Using a Starting Element:

$$\begin{cases} \Delta f(t) = \Delta i_A^2(t) + \Delta i_B^2(t) + \Delta i_C^2(t) \\ |d\Delta f(t)| > f_{set} \end{cases} \quad (1)$$

in the formula: $f_{set}$=0.1 kA², and $\Delta i_A(t)$, $\Delta i_B(t)$ and $\Delta i_C(t)$ being sudden changes of currents of three phases A, B and C.

Action time of the starting element is time when a protection element senses occurrence of the fault. In the embodiment of the disclosure, descriptions will be made with a sampling rate of 48 points per cycle as an example.

(2) A Free Wave Energy Protection Section I

The free wave energy protection section I is a quick section. Point-by-point sequence filtering and point-by-point integration are performed by using a half wave Fourier algorithm. Sequence filtering refers to filtering of zero-sequence and negative-sequence components, and integration refers to calculation of energy.

① Sequence Filtering

For points −2 to 22 at which the starting element acts, zero and negative-sequence variation phase sums $\Delta \dot{I}_0 + \Delta \dot{I}_{A2}$, $\Delta \dot{I}_0 + \Delta \dot{I}_{B2}$ and $\Delta \dot{I}_0 + \Delta \dot{I}_{C2}$ of variations $\Delta i_A(t)$, $\Delta i_B(t)$ and $\Delta i_C(t)$ of the currents of the three phases are calculated on a point-by-point basis by using a half wave Fourier sequence filtering window. The zero and negative-sequence phase sums are restored into sampling values $\Delta i_{A02}(t)$, $\Delta i_{B02}(t)$ and $\Delta i_{C02}(t)$ of the zero-sequence and negative-sequence sums. Then, the zero and negative-sequence components in variations of the sampling values are filtered using the following formula (2):

$$i_A(t) = \Delta i_A(t) - \Delta i_{A02}(t)$$

$$i_B(t) = \Delta i_B(t) - \Delta i_{B02}(t)$$

$$i_C(t) = \Delta i_C(t) - \Delta i_{C02}(t) \quad (2).$$

② Integration

A quadratic sum function is constructed on the basis of the formula (2) at first:

$$f(t) = i_A^2(t) + i_B^2(t) + i_C^2(t) \quad (3),$$

the quadratic sum function is differentiated, then an absolute value is calculated to obtain $|df(t)|$, and then $|df(t)|$ is integrated, thereby calculating free wave energy. Then, it is determined whether the free wave energy protection section I acts according to whether the following formula (4) and formula (5) are met:

$$\sum_{i \in I} |df(t)| > 250 + 2.5 \max_{i \in I} |df(t)| \quad I = \{-2, \ldots, 21\}. \quad (4)$$

After the sampling point 22, sequence filtering is performed using a full wave Fourier data window instead. Meanwhile, a fixed value is reduced. That is, the formula (4) is converted into the following formula:

$$\sum_{i \in I} |df(t)| > 150 + k \max_{i \in I} |df(t)| \quad I = \{-2, \ldots, 45\}, \quad (5)$$

in the formula (5), the value of k is reduced by a step length of 0.05 for the totally 48 sampling points which are from −2 to point 45 on a point-by-point basis and the initial value of k is set to 5.

Figure 3:
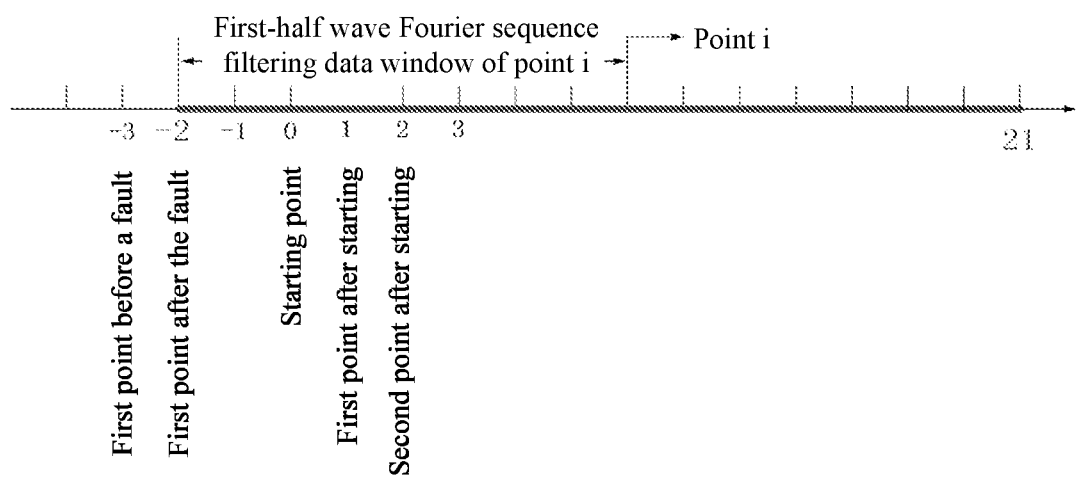
FIG. 3 is a schematic diagram of calculation points of a free wave energy protection section I according to a specific application example of the disclosure.

Selection calculation for the sampling points in the above calculation is shown in FIG. 3.

(3) A Free Wave Energy Protection Section II (Basic Section)

① Sequence Filtering

In this protection section, after the starting element acts, the zero-sequence and negative-sequence variation phase sums $\Delta \dot{I}_0 + \Delta \dot{I}_{A2}$, $\Delta \dot{I}_0 \Delta \dot{I}_{B2}$ and $\Delta \dot{I}_0 + \Delta \dot{I}_{C2}$ of $\Delta i_A(t)$, $\Delta i_B(t)$ and $\Delta i_C(t)$ are calculated by using the full wave Fourier sequence filtering window. The zero and negative-sequence phase sums are restored into zero and negative-sequence sampling value sums $\Delta i_{A02}(t)$, $\Delta i_{B02}(t)$ and $\Delta i_{C02}(t)$. Then, sequence filtering over the variations of the sampling values is completed using the formula (2).

② Integration

Similar to the free wave energy protection section I, the quadratic sum function $f(t) = i_A^2(t) + i_B^2(t) + i_C^2(t)$ is constructed for the variations, subjected to sequence filtering, of the sampling values, the quadratic sum function is differentiated, and then the absolute value is calculated to obtain $|df(t)|$. Then, $|df(t)|$ is integrated to obtain the free wave energy. A formula (6) is an expression of a low-fixed value section criterion of the free wave energy protection section II:

$$\sum_{i \in I} |df(t)| > 30 + 0.3 \sum_{i \in J} |df(t)| + 2 \max_{i \in I} |df(t)|. \quad (6)$$

In the above two formulae: I={4, . . . , 45} J={46, . . . , 57}.

Figure 4:
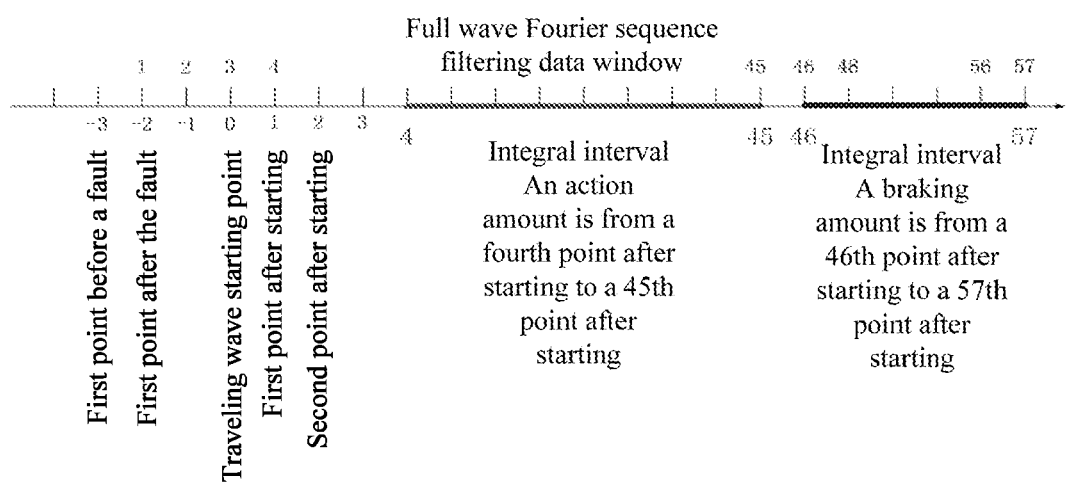
FIG. 4 is a schematic diagram of calculation points of a free wave energy protection section II according to a specific application example of the disclosure.

Selection calculation for the sampling points in the above calculation is shown in FIG. 4.

(4) A Free Wave Energy Protection Section III

Figure 5:
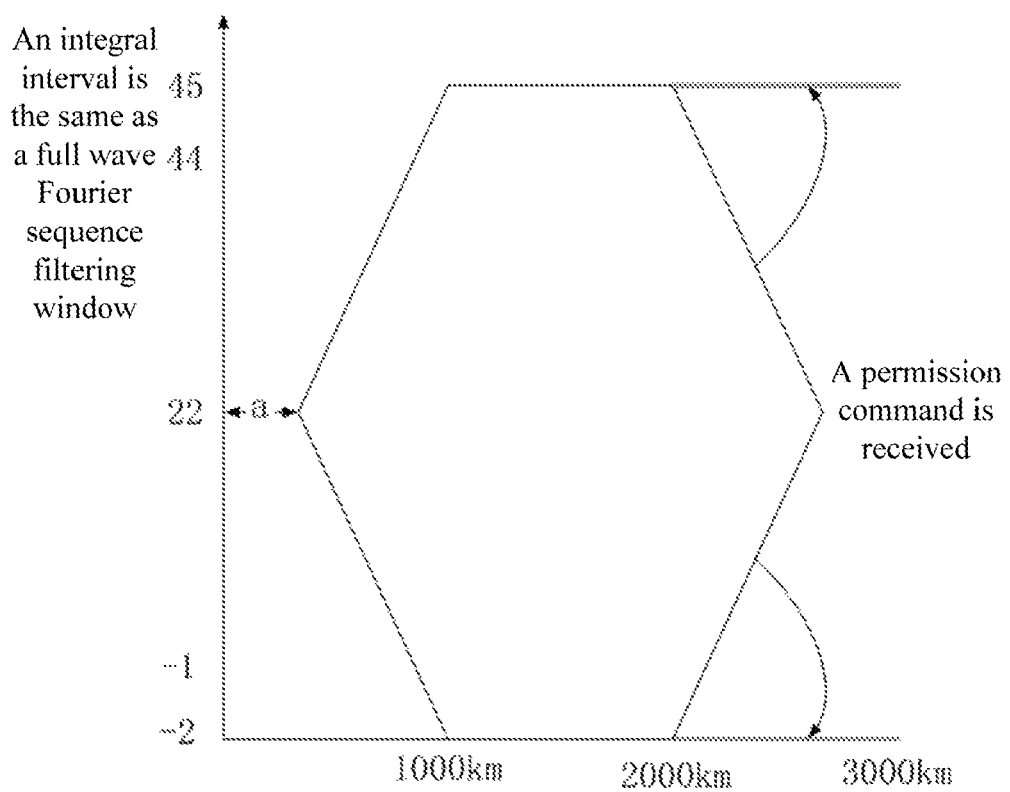
FIG. 5 is a schematic diagram of an integral interval of a free wave energy protection section III according to a specific application example of the disclosure.

The free wave energy protection section III changes the integral interval according to a distance measurement result and a permission command of an opposite side, thereby improving sensitivity of the free wave energy protection section III to ensure that protection may reliably act under the condition of determining that a fault in a region occurs. A criterion formula is expressed as follows:

$$\sum_{i \in I} |df(t)| > 8 + 2 \max_{i \in I} |df(t)| \quad I = \{L, \ldots, H\}, \quad (7)$$

in the formula, L being a lower limit of the integral interval, H being an upper limit of the integral interval, and its value being shown in FIG. 5.

As shown in FIG. 5, when the permission command is received and an estimation result of a position of the fault is more than 2,000 km, the integral interval includes the sampling points −2 to 45; when the estimation result of the position of the fault is within a range of $\{(1500-1), \ldots, (1500+1)\}$ 1≤500 km, the integral interval includes the sampling points −2 to 45; when the estimation result of the position of the fault is within a range $\{\alpha, \ldots, (1500-1)\}$, 1≤500 km, α≤100 km, the integral interval is L to H, where $$L = \frac{24}{1000 - a} 1 - \frac{12000}{1000 - a} - 2 \text{ and } H = 48 - L;$$

and when the estimation result of the position of the fault is within a range of $\{0, \ldots, \alpha\}$, α≤100 km, latching protection is performed.

(5) Free Wave Energy Protection

Figure 6:
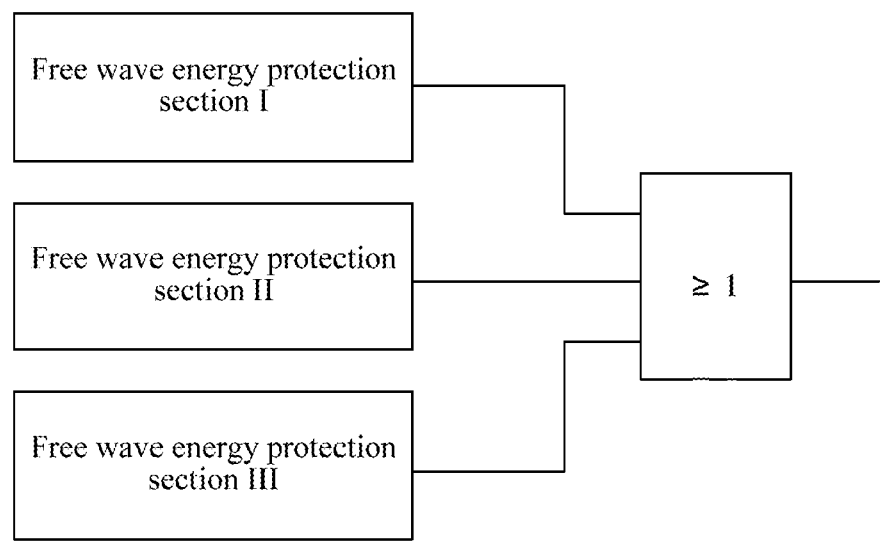
FIG. 6 is a logic diagram of free wave energy protection formed by a free wave energy protection section I, section II and section III according to a specific application example of the disclosure.
Figure 7:
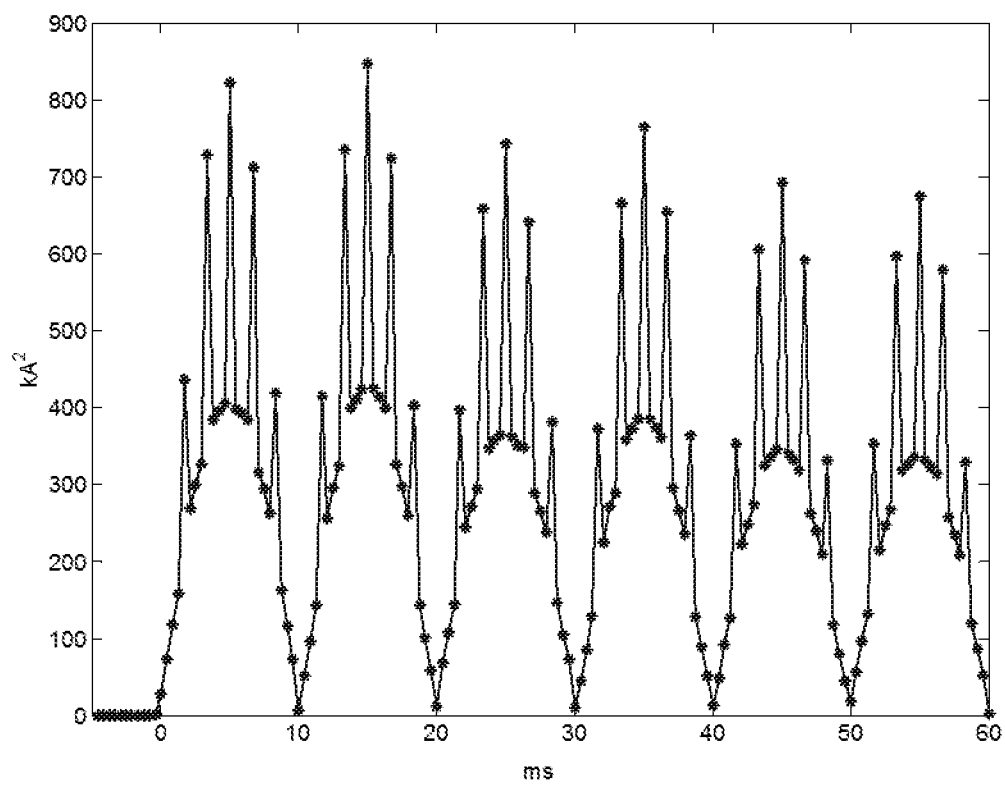
FIG. 7 is a schematic diagram of a free wave in case of a three-phase short-circuit fault at a point F1 at an outlet of a half wavelength line according to a specific application example of the disclosure.
Figure 8:
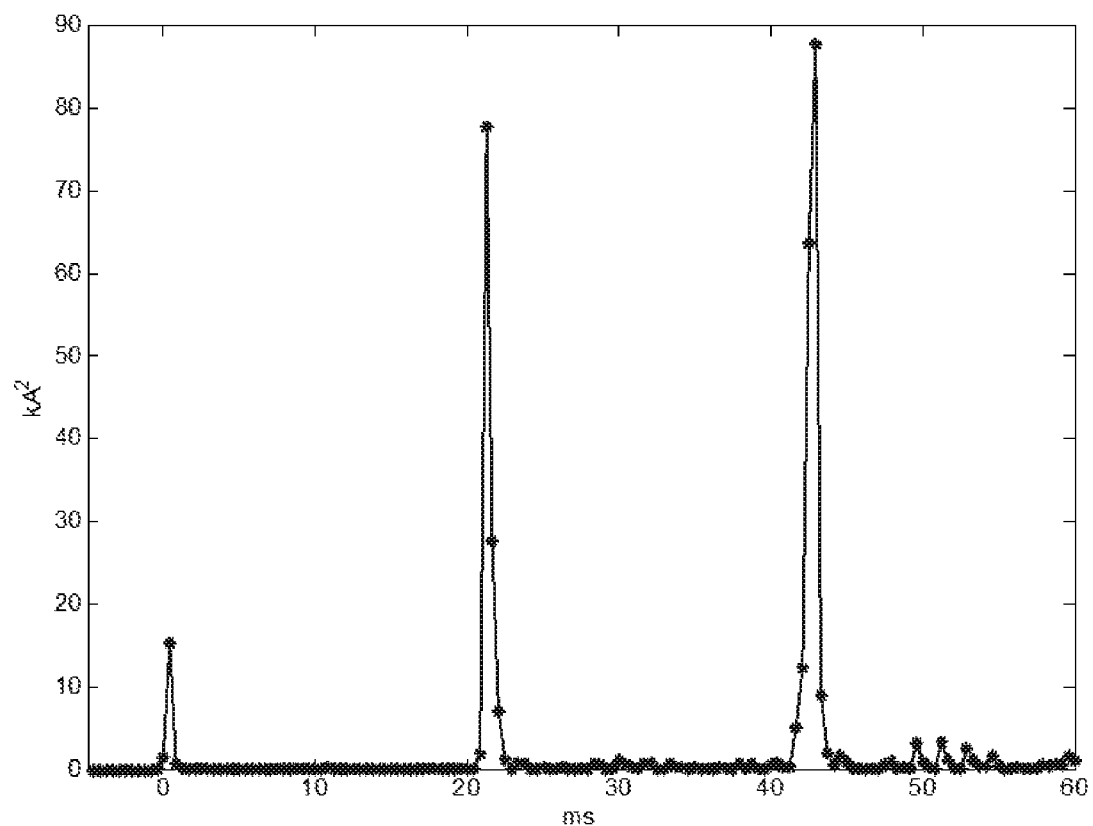
FIG. 8 is a schematic diagram of a free wave in case of a three-phase short-circuit fault at a point F8 at a reverse outlet of a half wavelength line according to a specific application example of the disclosure.
Figure 9:
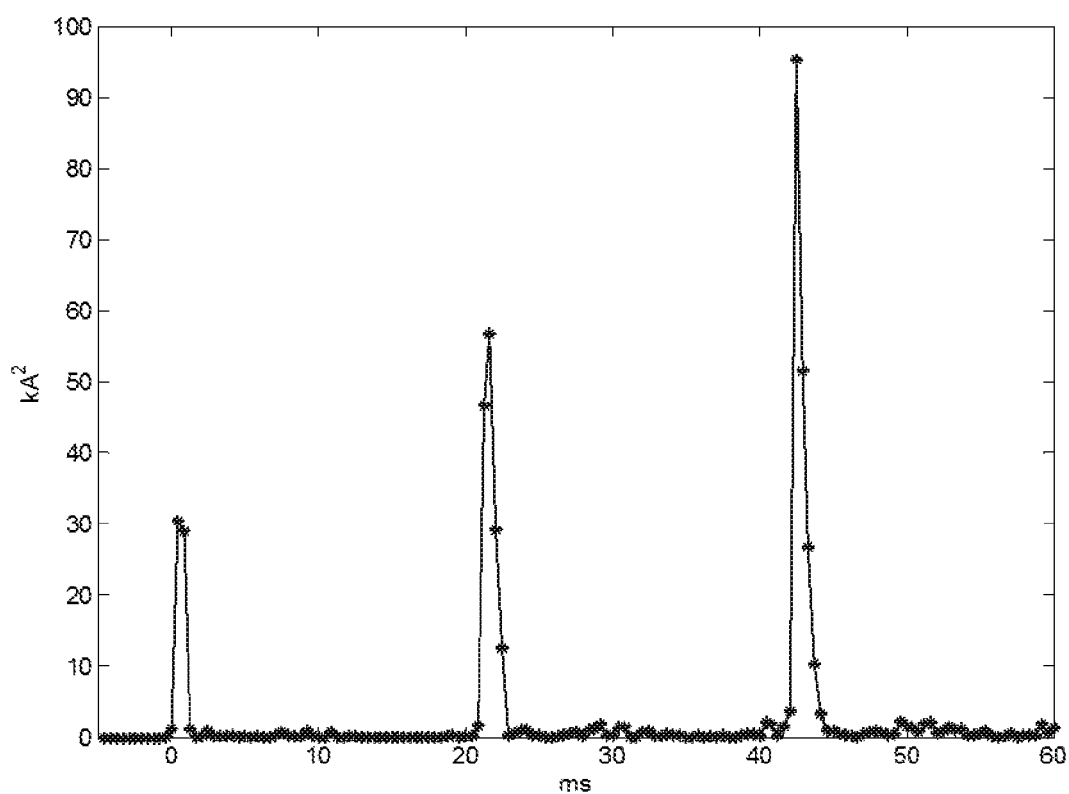
FIG. 9 is a schematic diagram of a free wave in case of a three-phase short-circuit fault at a point F8 at a reverse outlet of a half wavelength line according to a specific application example of the disclosure.

The free wave energy protection section I, section II and section III form free wave energy protection together. A specific logic is shown in FIG. 6, herein a free wave in case of a three-phase short-circuit fault at a point F1 at an outlet of the half wavelength line, a free wave in case of a three-phase short-circuit fault at a point F8 at the reverse outlet of the half wavelength line and a free wave in case of a three-phase short-circuit fault at the point F9 outside the forward region of the half wavelength line are shown in FIGS. 7, 8 and 9 respectively.

The above embodiments are adopted not to limit but only to describe the technical solutions of the disclosure. Although the disclosure has been described in detail with reference to the embodiments, those skilled in the art may still make modifications or equivalent replacements to specific implementation modes of the disclosure. Any modifications or equivalent replacements made without departing from the spirit and scope of the disclosure fall within the scope of protection of the claims of the disclosure applying for approval.

INDUSTRIAL APPLICABILITY

In the embodiments of the disclosure, the currents are sampled and calculated to obtain a free wave energy protection algorithm capable of effectively distinguishing faults in and outside the region through the protection measuring point. The algorithm includes the free wave energy protection quick action section, basic section and sensitive section. In such a manner, the technical solutions provided by the embodiments of the disclosure reduce the sampling rate of a conventional wave process-based algorithm, furthermore solve the problem of influence of a capacitive voltage transformer on the conventional wave process-based algorithm, have the advantages of accuracy, efficiency and reliability, consider both the reliability and sensitivity of the protection action over the half wavelength line, and ensure the safe and reliable operation of the half wavelength line.

The invention claimed is:

1. A single-side current-based free wave energy protection method for a half wavelength line, wherein a protection measuring point and a starting element are arranged on the half wavelength line, three protection sections are set for free wave energy, and the protection sections comprise a quick action section, a basic section and a sensitive section, the method comprising the following steps:

Step 1: sampling and calculating, by the protection measuring point, currents to obtain variations of current sampling values;

Step 2: causing the starting element to act to determine occurrence time of a fault of the half wavelength line;

Step 3: calculating the variations of the current sampling values within the quick action section to obtain the free wave energy, determining whether the quick action section acts, if YES, causing the quick action section to act for protection, and if NO, proceeding to Step 4;

Step 4: calculating the current sampling values within the basic section to obtain the free wave energy, determining whether the basic section acts, if YES, causing the basic section to act for protection, and if NO, proceeding to Step 5; and Step 5: determining whether the sensitive section acts according to a position of the fault and a permission command, if YES, causing the sensitive section to act for protection, and if NO, returning to Step 1.

2. The method according to claim 1, wherein Step 1 comprises:

Step 1-1: sampling, by the protection measuring point, current values of a cycle before occurrence of the fault and present current values respectively to obtain a before-fault sampling value and present sampling value of each phase current, wherein a sampling rate is 48 sampling points per cycle; and Step 1-2: calculating the variations of the current sampling values according to the before-fault sampling values and present sampling values of the currents.

3. The method according to claim 1, wherein Step 2 comprises:

causing the starting action to act to determine the occurrence time t of the fault of the half wavelength line:

$$\begin{cases} \Delta f(t) = \Delta i_A^2(t) + \Delta i_B^2(t) + \Delta i_C^2(t) \\ |d\Delta f(t)| > f_{set} \end{cases} \quad (1)$$

in the formula (1), $f_{set}$ being an action fixed value and $f_{set}=0.1KA^2$, $\Delta i_A(t)$, $\Delta i_B(t)$ and $\Delta i_C(t)$ being sudden changes of the currents of the three phases A, B and C respectively and $\Delta f(t)$ being a variation of a quadratic sum of the sudden changes of the currents of the three phases.

4. The method according to claim 1, wherein Step 3 comprises:

Step 3-1: for sampling points −2 to 22 at which the starting element acts, calculating zero-sequence and negative-sequence variation phases of the variations $\Delta i_A(t)$, $\Delta i_B(t)$, $\Delta i_C(t)$ of the currents of the three phases on a point-by-point basis by using a half wave Fourier sequence filtering window, and calculating values of $\Delta \dot{I}_0 + \Delta \dot{I}_{A2}$, $\Delta \dot{I}_0 + \Delta \dot{I}_{B2}$ and $\Delta \dot{I}_0 + \Delta \dot{I}_{C2}$, where $\Delta \dot{I}_0$ is the variation phase value of the zero-sequence current, and $\Delta\dot{I}_{A2}$, $\Delta\dot{I}_{B2}$ and $\Delta\dot{I}_{C2}$ are variation phase values of negative-sequence currents of the phases A, B and C respectively;

Step 3-2: restoring the zero-sequence and negative-sequence phase sums of the phases A, B and C into sampling values $\Delta i_{A0}(t)$, $\Delta i_{B0}(t)$ and $\Delta i_{C0}(t)$;

Step 3-3: filtering zero and negative sequences in the variations of the sampling values to obtain current variation sampling values $i_A(t)$, $i_B(t)$ and $i_C(t)$ subjected to filtering of the zero sequences and the negative sequences:

$$i_A(t)=\Delta i_A(t)-\Delta i_{A02}(t)$$

$$i_B(t)=\Delta i_B(t)-\Delta i_{B02}(t)$$

$$i_C(t)=\Delta i_C(t)-\Delta i_{C02}(t) \qquad (2),$$

in the formula (2), $\Delta i_A(t)$, $\Delta i_B(t)$ and $\Delta i_C(t)$ being the variations, caused by the fault, of the current sampling values of the currents of the phases A, B and C at a moment t;

Step 3-4: constructing a quadratic sum function $f(t)$:

$$f(t)=i_A^2(t)+i_B^2(t)+i_C^2(t) \qquad (3),$$

differentiating the quadratic sum function, then calculating an absolute value to obtain $|df(t)|$, and integrating $|df(t)|$ to obtain a free wave energy value;

Step 3-5: determining whether the following formula (4) about the free wave energy is true:

$$\sum_{i\in I}|df(t)| > 250 + 2.5\max_{i\in I}|df(t)| \quad I=\{-2,\ldots,21\}, \qquad (4)$$

in the formula (4), i being a sampling point and I being an integral interval, if the formula (4) is false, proceeding to Step 4, and
if the formula (4) is true, proceeding to 3-6; and Step 3-6: after the sampling point 22, performing sequence filtering using a full wave Fourier data window, and converting the formula (4) into the following formula (5), determining whether the formula (5) is true:

$$\sum_{i\in I}|df(t)| > 150 + k\max_{i\in I}|df(t)| \quad I=\{-2,\ldots,45\}, \qquad (5)$$

in the formula (5), the value of k is reduced by a step length of 0.05 for totally 48 sampling points which are from point −2 to point 45 on a point-by-point basis and the initial value of k is set to 5, if the formula (5) is false, proceeding to Step 4, and
if the formula (5) is true, causing the quick action section to act for protection.

5. The method according to claim 4, wherein Step 4 comprises:

Step 4-1: calculating the zero-sequence and negative-sequence variation phases of the variations $\Delta i_A(t)$, $\Delta i_B(t)$ and $\Delta i_C(t)$ of the currents of the three phases by using the full wave Fourier sequence filtering window, and calculating the values of $\Delta\dot{I}_0+\Delta\dot{I}_{A2}$, $\Delta\dot{I}_0+\Delta\dot{I}_{B2}$ and $\Delta\dot{I}_0+\Delta\dot{I}_{C2}$, where $\dot{I}_{A[0]}$, $\dot{I}_{B[0]}$ and $\dot{I}_{C[0]}$ are the after-fault phase values of the currents of the phases A, B and C respectively, and $\Delta\dot{I}_{A2}$, $\Delta\dot{I}_{B2}$ and $\Delta\dot{I}_{C2}$ are the variation phase values of the negative-sequence currents of the phases A, B and C respectively;

Step 4-2: restoring the zero-sequence and negative-sequence phase sums of the phases A, B and C into the sampling values $\Delta i_{A0}(t)$, $\Delta i_{B0}(t)$ and $\Delta i_{C0}(t)$;

Step 4-3: filtering the zero and negative sequences in the variations of the sampling values, and obtaining, according to the formula (2), the current variation sampling values $i_A(t)$, $i_B(t)$ and $i_C(t)$ subjected to filtering of the zero sequences and the negative sequences;

Step 4-4: constructing the quadratic sum function $f(t)$ according to the formula (3), differentiating the quadratic sum function, then calculating the absolute value to obtain $|df(t)|$, and integrating $|df(t)|$ to obtain the free wave energy value; and Step 4-5: determining whether the following formula (6) about the free wave energy is true:

$$\sum_{i\in I}|df(t)| > 30 + 0.3\sum_{i\in J}|df(t)| + 2\max_{i\in I}|df(t)|, \qquad (6)$$

in the formula (6), $I=\{4,\ldots,45\}$ $J=\{46,\ldots,57\}$,
if the formula (6) is false, proceeding to Step 4, and
if the formula (6) is true, causing the basic section to act for protection.

6. The method according to claim 5, wherein Step 5 comprises:

determining whether a criterion formula (7) for the sensitive section is true according to the position of the fault and the permission command:

$$\sum_{i\in I}|df(t)| > 8 + 2\max_{i\in I}|df(t)| \quad I=\{L,\ldots,H\}, \qquad (7)$$

in the formula (7), L being a lower limit of the integral interval and H being an upper limit of the integral interval;

if the permission command is received and an estimation result of the position of the fault is more than 2,000 km, causing the sensitive section to act for protection, and determining that the integral interval I comprises the sampling points −2 to 45;

if the permission command is received and the estimation result of the position of the fault is within a range of $\{(1500-1),\ldots,(1500+1)\}$ $1\leq 500$ km, causing the sensitive section to act for protection, and determining that the integral interval I comprises the sampling points −2 to 45;

if the permission command is received and the estimation result of the position of the fault is within a range $\{\alpha,\ldots,(1500-1)\}$, $1\leq 500$ km, $\alpha\leq 100$ km, causing the sensitive section to act for protection, and determining that the integral interval I is L to H, wherein $$L = \frac{24}{1000-a}1 - \frac{12000}{1000-a} - 2 \text{ and } H = 48-L;$$

and
when the permission command is not received or the estimation result of the position of the fault is within a range of $\{0, \ldots, \alpha\}$, $\alpha \leq 100$ km, performing latching protection, and returning to Step 1.

* * * * *